Sept. 8, 1931.  A. W. BROWN  1,822,581
COMBINED BREAD BOX, SLICER, AND KNIFE HOLDER
Filed June 20, 1929  2 Sheets-Sheet 1
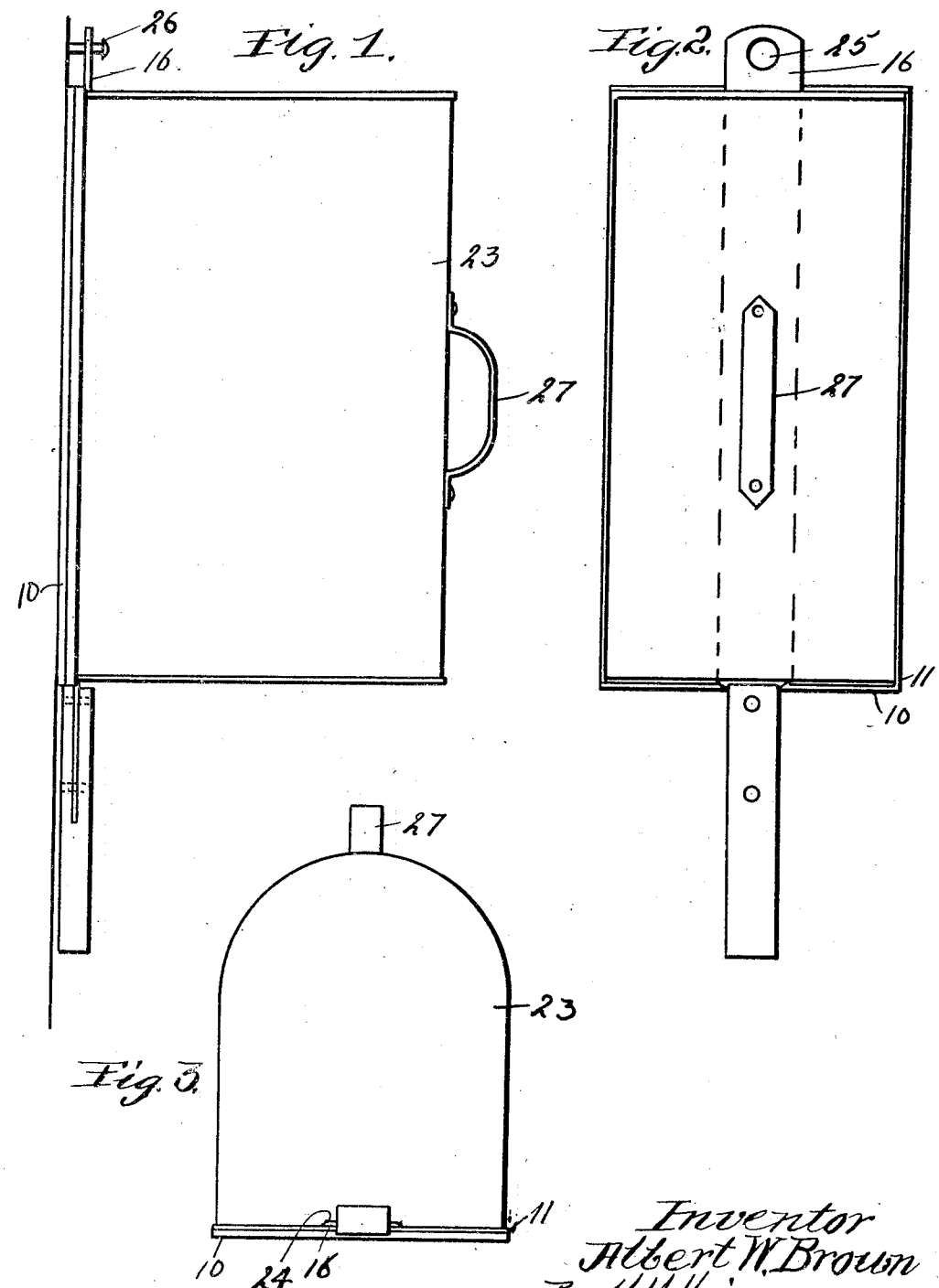

Sept. 8, 1931.  A. W. BROWN  1,822,581
COMBINED BREAD BOX, SLICER, AND KNIFE HOLDER
Filed June 20, 1929  2 Sheets-Sheet 2
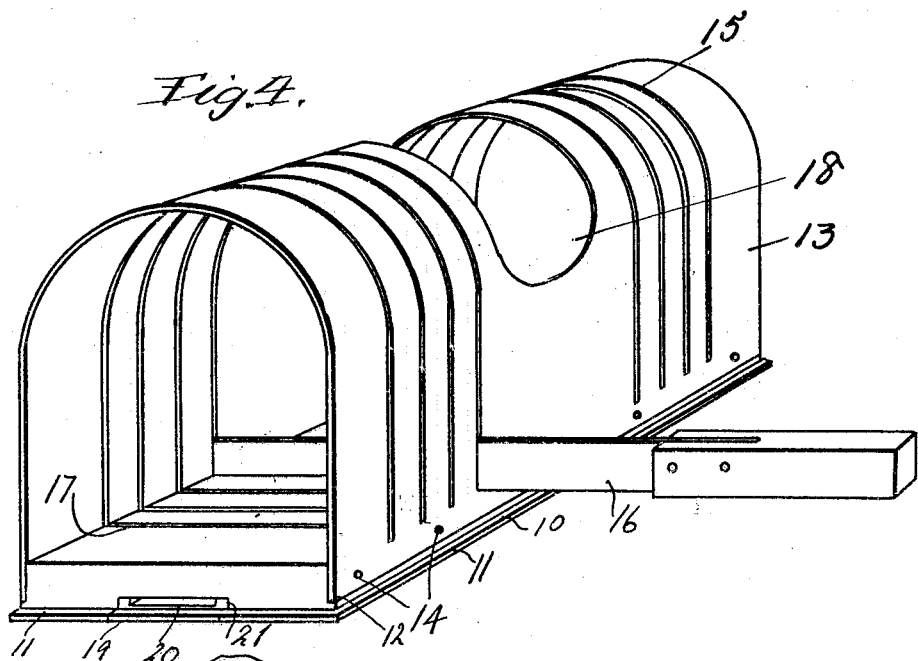
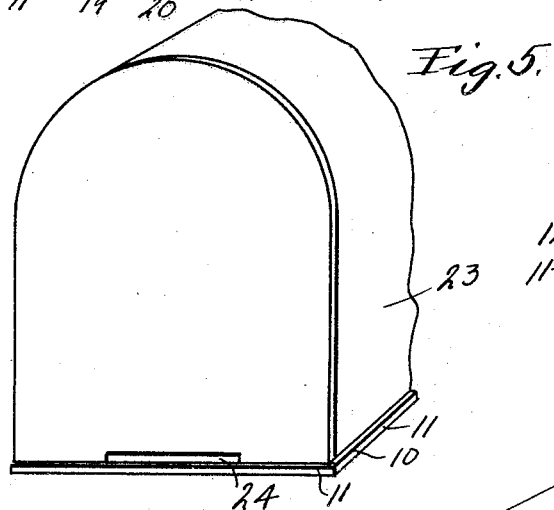
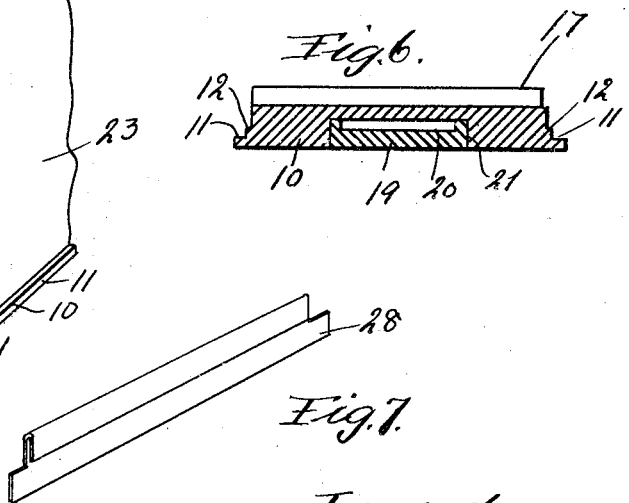
Inventor
Albert W. Brown Patented Sept. 8, 1931

1,822,581

UNITED STATES PATENT OFFICE

ALBERT W. BROWN, OF HATBORO, PENNSYLVANIA

COMBINED BREAD BOX, SLICER, AND KNIFE HOLDER

Application filed June 20, 1929. Serial No. 372,408.

My invention relates to new and useful improvements in a combined bread box, slicer and knife holder, and has for its object to provide an exceedingly simple and convenient device of this description in which a loaf of bread may be kept and thoroughly protected against dust or insects and by the removal of the cover, any portion of the loaf may be cut into predetermined slices.

A further object of the invention is to provide for the cover being held in place by the knife and the knife utilized as means for hanging the device upon a wall.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a side elevation of the device shown hung upon a nail.

Fig. 2 is a front view of Fig. 1.

Fig. 3 is an end view of Fig. 1.

Fig. 4 is a perspective of the structure for holding and slicing a loaf of bread, the knife being shown in position in one of the guiding slots.

Fig. 5 is a perspective of one end of the cover, showing one of the openings through which the knife is inserted into the cutting board for retaining the cover in place.

Fig. 6 is a cross section of the cutting board showing the construction for forming the knife housing slot.

Fig. 7 is a perspective of a thin strip for gauging the position of a loaf of bread relative to the guide slots.

In carrying out my invention as herein embodied, 10 represents the cutting board which has a ledge 11 formed around its four edges and secondary ledges 12 formed along its longitudinal sides, these latter ledges being for seating the lower edges of the slicing guide 13, the latter being secured to the sides of the board in any suitable manner, such as by driving the nails 14 into the board, the slicing guide 13 is provided with the guiding slots 15 for the insertion of the knife 16 and the board is provided with a series of crosswise slots 17 coinciding with the slots 15 so that in slicing a loaf of bread, the cutting edges of the knife passes into one of the slots 17 in order that the loaf may be cut through at the bottom, as will be readily understood.

The guide 13 is cut away as indicated at 18 to give the hand of the operator access to the loaf so as to move the latter along in the guide and hold it during the slicing operation.

19 represents an inset having the groove 20 in its upper face so that when this inset is secured within the groove 21 formed in the cutting board, a passageway for the blade 16 is provided.

23 represents the cover which is adapted to fit over the cutting board, its lower edges resting upon the beads 11 and this cover has a narrow opening 24 in each end thereof, which openings coincide with the groove 20 so that when the blade of the knife is passed through the openings 24 and the groove 20, until the handle of the knife is brought into contact with one end of the cover, the end of the blade will project beyond the opposite end of the cover and as the end of this blade has a hole 25 formed therein, the device may be hung upon a wall by passing this hole over a nail, such as 26. This arrangement not only securely holds the cover in place upon the cutting board, but provides for the supporting of the device upon the inner end of the handle of the knife, as clearly shown in Figs. 1 and 2.

In practice, a loaf of bread is placed within the slotted guide 13 and grasped by the hand through the cut-away portion 18, after which the knife blade may be passed into one or more of the guide slots 15, thereby enabling the operator to cut the bread in slices of predetermined thicknesses, it being seen that the loaf may be moved lengthwise of the guide as it is reduced in length by the slicing process so that the entire loaf may be sliced up.

The cover is provided with the handle 27 so that it may be readily moved from place to place.

The guide 13 being in the form of an arch greatly facilitates the insertion of the knife blade in the slots 15 since when said blade is initially inserted in the upper portion of any one of the slots, it will readily follow these slots on both sides of the guide.

Considerable annoyance has heretofore been experienced in the sanitary care of bread to properly house the same against dust, insects and mice, especially flies and small ants, but this proper housing is effectually provided by my improved device, while at the same time providing for the proper slicing thereof.

When found desirable, a thin strip 28 may be inserted in one of the slots 15 and utilized as a gauge against which the end of a loaf of bread may be abutted for determining the position of said loaf relative to the other slots.

Of course I do not wish to be limited within the exact details of construction as herein shown, as these may be varied within the limits of the appended claims without departing from the spirit of my invention.

Having thus fully described by invention, what I claim as new and useful is:—

1. As a new article of manufacture, a combined bread box, slicer and knife holder comprising a cutting board, having a groove formed therein for the passage of the knife blade, an arch shaped housing having guide slots therein, said housing being secured to said board, and a cover adapted to fit over the housing, said cover having openings in its end walls for coinciding with the ends of the groove whereby the passage of the knife through said openings and groove will secure the cover in position upon the board.

2. In a device of the character described, a cutting board having slots therein, a grooved insert secured in said board and forming a passageway, an arch-shaped slotted housing secured to the board in such manner that the slots in said housing coincide with the slots in the board; a cover adapted to fit over and enclose the housing and having openings for registration with the slot, and means projected through the openings in the housing and the passageway in the cutting board for securing said cover to the cutting board.

3. In combination with a device of the character described, having a cutting board with the passageway for a knife formed therein and a cover having openings in its ends to coincide with the said passageway, a knife, the blade of which is adapted to pass through said passageway, the end of said knife having a hole therein for registration with a nail to suspend the device upon the handle of the knife.

In testimony whereof, I have hereunto affixed my signature.

ALBERT W. BROWN.